United States Patent
Pham et al.

(10) Patent No.: US 8,954,084 B2
(45) Date of Patent: Feb. 10, 2015

(54) METHOD AND SYSTEM FOR REDUCING MAC-IS RESET AMBIGUITY FOR COMMON E-DCH TRANSMISSIONS

(75) Inventors: Huy Thang Pham, Dollard-des-Ormeaux (CA); Vikas Dhingra, Karnataka (IN); Jindong Hou, Swindon (GB); Jing Zhang, Kanata (CA)

(73) Assignee: Alcatel Lucent, Boulogne-Billancourt (FR)

( * ) Notice: Subject to any disclaimer, the term of this patent is extended or adjusted under 35 U.S.C. 154(b) by 542 days.

(21) Appl. No.: 13/195,118

(22) Filed: Aug. 1, 2011

(65) Prior Publication Data

US 2013/0035102 A1  Feb. 7, 2013

(51) Int. Cl.
*H04W 72/00* (2009.01)
*H04L 1/18* (2006.01)

(52) U.S. Cl.
CPC ............ *H04L 1/18* (2013.01); *H04L 1/1809* (2013.01); *H04L 1/1822* (2013.01); *H04L 1/1803* (2013.01)
USPC ......... 455/450; 455/452.1; 455/453; 455/451

(58) Field of Classification Search
CPC ....... H04L 1/18; H04L 1/1803; H04L 1/1809; H04L 1/1822; H04L 1/1825; H04L 1/1829; H04L 1/1867
USPC .............. 455/450, 452.1, 453, 451
See application file for complete search history.

(56) References Cited

U.S. PATENT DOCUMENTS

| | | | |
|---|---|---|---|
| 2009/0181710 A1 | 7/2009 | Pani et al. | |
| 2010/0220709 A1* | 9/2010 | Peisa | 370/345 |
| 2010/0325502 A1* | 12/2010 | Lindskog et al. | 714/748 |
| 2011/0317546 A1* | 12/2011 | Zhang et al. | 370/216 |
| 2013/0028234 A1* | 1/2013 | DiGirolamo et al. | 370/331 |
| 2013/0150062 A1* | 6/2013 | Pani et al. | 455/450 |
| 2013/0163564 A1* | 6/2013 | Pani et al. | 370/332 |
| 2014/0286231 A1* | 9/2014 | Marinier et al. | 370/315 |

OTHER PUBLICATIONS

Ericsson: "Introduction of Improved L2 for Uplink", 3GPP Draft; R3-080506, 3rd Generation Partnership Project (3GPP), Mobile Competence Centre; 650, Route Des Lucioles; F-06921 Sophia-Antipolis Cedex; France, vol. RAN WG3, no. Sorrento, Italy; Feb. 18, 2008, XP050163703, [retrieved on Feb. 18, 2008].

(Continued)

*Primary Examiner* — Khai M Nguyen
(74) *Attorney, Agent, or Firm* — Wall & Tong LLP

(57) ABSTRACT

A method and system in which a UMTS base station determines if any UE has re-acquired a common Enhanced Dedicated Channel (E-DCH) resource, and responsively transmits a indicator toward an RNC that is adapted to cause the RNC to recognize the beginning of a new transmission session so that the RNC may responsively perform appropriate actions such as flushing the TSN re-ordering queue, restarting a MAC-is re-ordering algorithm and the like.

22 Claims, 8 Drawing Sheets

(56) References Cited

OTHER PUBLICATIONS

Qualcomm Europe: "Email discussion outcome for [67b#19] UMTS: DC-HSUPA in 25.321", 3GPP Draft; R2-096840 Email Discussion Outcome for 67B129 UMTS DC-HSUPA in 25.321, $3^{rd}$ Generation Partnership Project (3GPP), Mobile Competence Centre; 650, Route Des Lucioles; F-06921 Sophia-Antipolis Cedex; France, vol. RAN WG2, no. Jeju, Republic of Korea Nov. 9, 2009-Nov. 13, 2009, Nov. 3, 2009, XP050604834, [retrieved on Nov. 3, 2009).

The International Search Report and the Written Opinion of the International Searching Authority, or the Declaration, in PCT/IB2012/001453, mailed Nov. 23, 2012, Alcatel Lucent, Applicant, 13 pages.

* cited by examiner

METHOD AND SYSTEM FOR REDUCING MAC-IS RESET AMBIGUITY FOR COMMON E-DCH TRANSMISSIONS

FIELD OF THE INVENTION

The invention relates generally to managing network resources such as in a wireless network and, more specifically but not exclusively, adapting an update function associated with a mobile services database.

BACKGROUND

In the Universal Mobile Telecommunications System (UMTS) system, a User Equipment (UE) with a Radio Resource Control (RRC) Connection can be in CELL_DCH, CELL_FACH, CELL_PCH or URA_PCH state. UE with data traffic is put into CELL_DCH or CELL_FACH where it is able to transmit and receive user data. CELL_FACH state is usually used for UE with low burst traffic activity.

Enhanced CELL_FACH in UMTS allows the UE to receive HSDPA (High Speed Downlink Packet Access) packets. This enables the UE to receive large burst of downlink data. Enhanced Uplink CELL_FACH in UMTS allows the UE to send a large burst of uplink data using HSUPA (High Speed Uplink Packet Access). The Enhanced Uplink CELL_FACH is a superset of Enhanced CELL_FACH, meaning the HSUPA in CELL_FACH requires the HSDPA in CELL_FACH.

The bursty nature of smartphone traffic is suited for the Enhanced Uplink CELL_FACH state since it uses the resources (HSDPA and HSUPA resources) more efficiently compared to that in CELL_DCH. The number of smartphone devices is expected to increase significantly in the future and hence it is expected that more UE will reside in the Enhanced Uplink CELL_FACH state.

MAC-i and MAC-is entities are two of the building blocks for Enhanced Uplink CELL_FACH transmission. The MAC-i implements the Hybrid Automatic Repeat Request (HARQ) protocol, which is based on synchronous (re)transmission in the uplink and synchronous downlink Acknowledge/Negative-acknowledge (ACK/NACK). The number of HARQ process depends on the Transmission Time Interval (TTI): 8 processes for 2 ms TTI, and 4 processes for 10 ms TTI. The parameter "Maximum Number of HARQ retransmissions" (MaxNHarq) defines the upper limit on the number of HARQ retransmission.

The MAC-is at the Radio Network Control (RNC) implements the re-ordering and reassembly functions. The re-ordering process is per logical channel and is based on the Transmission Sequence Number (TSN). At every TTI, all data belonging to the same logical channel is carried in a MAC-is Protocol Data Unit (PDU), which may comprise one or more MAC-is Service Data Units (SDUs). Each MAC-is SDU is mapped to one or a part of a MAC-d PDU. The mapping of MAC-d PDU to RLC PDU is 1:1. To handle new transmission, at every TTI and for each logical channel the UE MAC-i/is generates a new TSN and associates it to a MAC-is PDU. At every TTI, the MAC-i can multiplex multiple logical channels, hence multiple MAC-is PDUs, each of which would carry its own TSN number.

Unfortunately, ambiguous conditions may exist when, illustratively, the RNC detects a nominal in-sequence TSN and an out-of-order TSN such as due to the re-acquisition of the common E-DCH resources by UE. If the RNC mistakenly delivers the out of order TSN to the next higher layer right away, this would induce out-of-order RLC PDU(s), which has a negative impact on capacity. The most common case is redundant RLC retransmission, such as might be triggered by the RLC upon detection of a RLC Sequence Number (SN) gap. Moreover, the delivering of an out-of-order Status RLC PDU could result in an RLC Reset condition.

BRIEF SUMMARY

Various deficiencies of the prior art are addressed by the present invention of a method for improving common E-DCH resources usage and traffic latency by providing mechanisms that avoid RNC ambiguity pertaining to UE consumption of common E-DCH resources.

Various embodiments generally provide a method and system in which a UMTS base station (NodeB or NB) determines if any UE has re-acquired a common Enhanced Dedicated Channel (E-DCH) resource, and responsively transmits an indicator towards a RNC that is adapted to cause the RNC to recognize the beginning of a new transmission session (i.e., a change in connection session) and responsively perform any appropriate actions (e.g., flush the TSN re-ordering queue, restart the MAC-is re-ordering algorithm and the like).

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention will be primarily described within the context of a method, system and apparatus in which a UMTS base station (NodeB or NB) determines if any UE has re-acquired a common Enhanced Dedicated Channel (E-DCH) resource, and responsively transmits an indicator towards an RNC that is adapted to cause the RNC to recognize the beginning of a new transmission session (i.e., a change in connection session). In this manner, the RNC may responsively perform any appropriate actions such as to flush the TSN re-ordering queue, restart the MAC-is re-ordering algorithm and the like.

Various embodiments advantageously improve common E-DCH resource usage and traffic latency within the context of a UMTS Radio Network Controller (RNC) in communication with base stations or NodeBs (NBs) serving user equipment. Generally speaking, the various embodiments provide mechanisms that avoid RNC ambiguity pertaining to UE consumption of common E-DCH resources so that rapid and correct resource allocation decisions may be made by the RNC with respect to the various Base Stations and the user equipment serviced thereby.

For example, in some embodiments, by recognizing the beginning of a new transmission session, the RNC responsively updates performance and usage data associated with the UE (e.g., smartphone, computer and the like) so that the RNC or a cooperating network management system may improve network operations and Key Performance Indicators (KPIs) associated with network usage. For example, the RNC may update statistics related to UE resource consumption, observe actual traffic patterns for UE service or application behavior, and responsively tune High Speed Downlink Packet Access (HSDPA) in CELL_FACH and/or High Speed Uplink Packet Access (HSUPA) in CELL_FACH (e.g., EUL in CELL_FACH) operation parameters.

Figure 1:
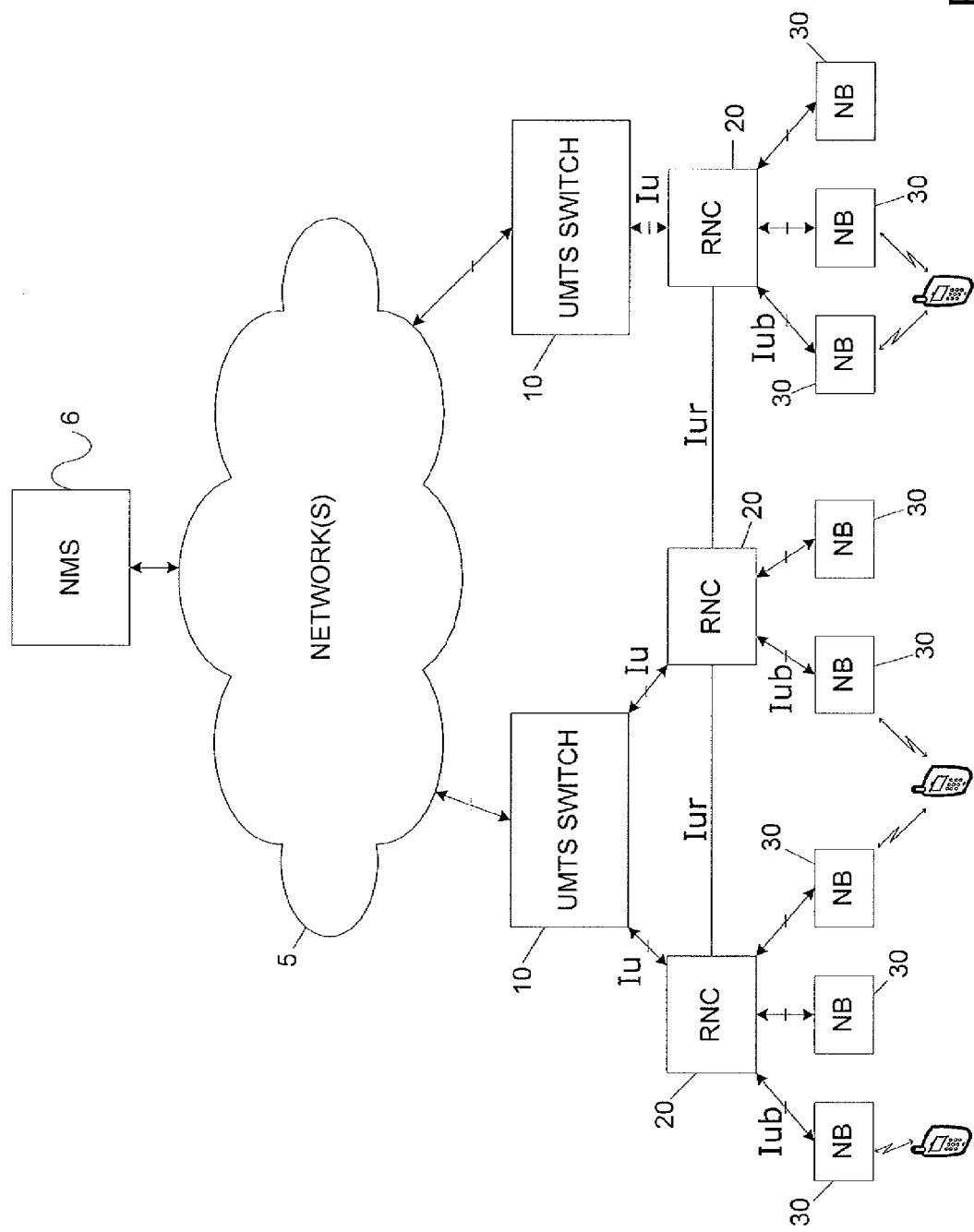
FIG. 1 depicts a high level block diagram of a network benefiting from various embodiments.

FIG. 1 depicts a high level block diagram of a network benefiting from various embodiments. Specifically, FIG. 1 depicts a 3GPP (3rd Generation Partnership Project) Universal Mobile Telecommunication System (UMTS) mobile network 100 generally operating in a Frequency Division Duplex (FDD) mode.

Specifically, FIG. 1 depicts a plurality of UMTS mobile service switches 10 belonging to a Core Network (CN). Each of the mobile service switches 10 is linked to one or more networks 5 and, by means of a Iu interface, to one or more Radio Network Controllers (RNC) 20. Each RNC 20 is linked to one or more Base Stations (NB) 30 by means of a Iub interface. The Base Stations (NB) 30, which are distributed over a network coverage area, can communicate by radio with mobile terminals 40, illustratively User Equipment (UE) 40-1, 40-2 and 40-3. Some RNCs 20, such as those operating as Drift RNCs (DRNCs) and Service RNCs (SRNCs), can additionally communicate with each other by means of a Iur interface. Various network management functions may be provided by, illustratively, a network management system (NMS) 6 operatively coupled to the various networks elements and subelements discussed herein.

Each of the mobile service switches 10, RNCs 20, NBs 30 and UEs 40 include various radio devices, switching technologies, input-output technologies, controller/computer hardware and software and the like to implement appropriate communications and control functionality as is known. Such functionalities include, illustratively, packet buffering, packet routing, radio communications, message handling, and so on; generally speaking, the various control plane and data plane functions enabling communication within the context of a UMTS mobile network.

The various control plane and data plane functions are described in more detail in the various technical specifications of the 3rd Generation Partnership Project (3GPP), such as the Iu interface specifications TS 25.410-25.415 (V10.x published June 2011); Iub interface specifications TS 25.430-25.435 (V10.x published June 2011); Iub/Iur interface specification TS 25.427 (V10.x published June 2011); Iur interface specification TS 25.420-25.425 (V10.x published June 2011); RRC specification TS 25.331 (V10.x published July 2011); HSDPA specification TS 25.308 (V10.x published June 2011); E-DCH (HSUPA) specification TS 25.319 (V11.x published June 2011), which technical specifications are incorporated herein by reference in their entireties. Moreover, hardware and/or software such as discussed below with respect to FIG. 5 may be used within the context of the mobile service switches 10, RNCs 20, NBs 30 and UEs 40.

Of particular interest within the context of the present embodiments is the technical specification 3G TS 25.319, "Radio Access Network Enhanced Uplink Overall Description", version 11.0.0 published in June 2011 by the 3GPP.

This technical specification describes, among other things, a protocol architecture associated with Enhanced Dedicated Channel (E-DCH) resources.

Figure 2A:
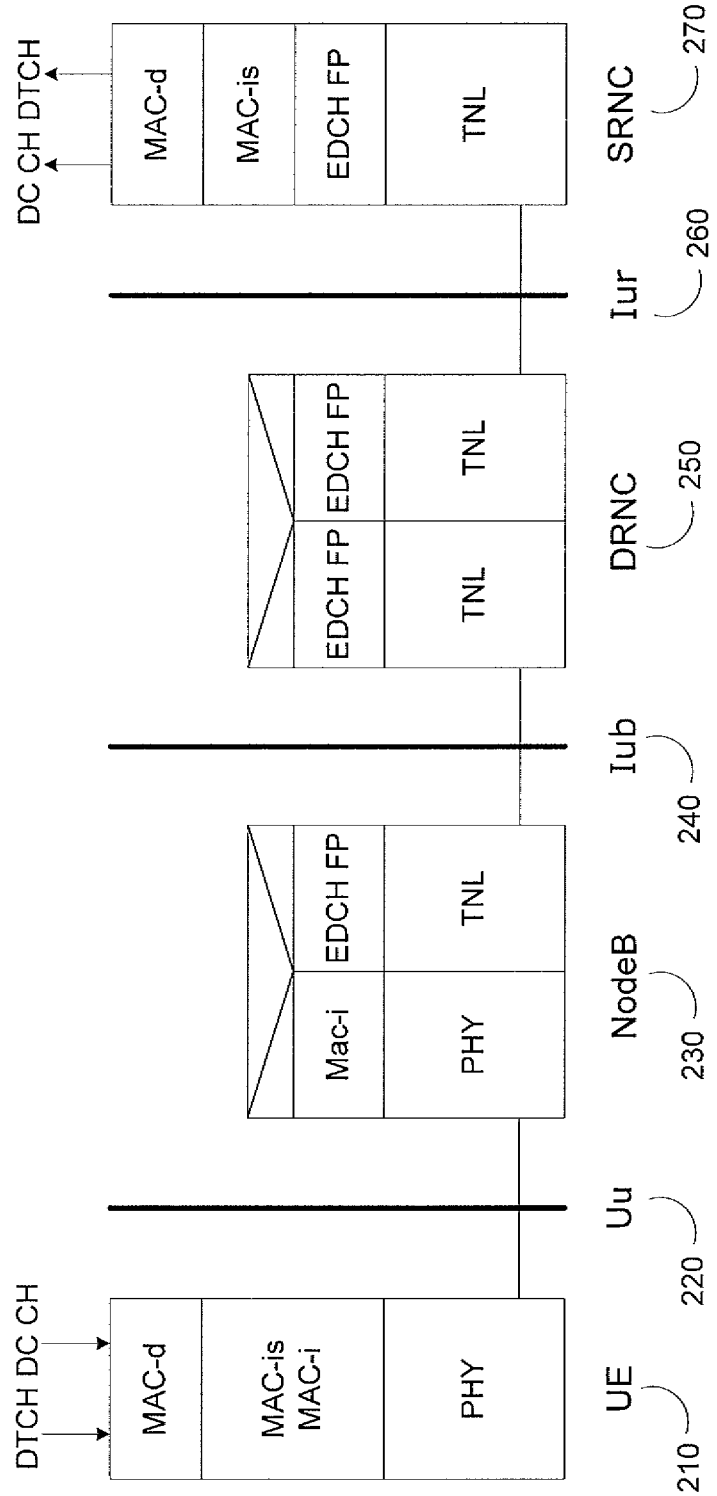
FIG. 2A graphically depicts a simplified protocol architecture useful in understanding the present embodiments.

FIG. 2A graphically depicts a simplified protocol architecture useful in understanding the present embodiments. Specifically, FIG. 2A depicts a simplified protocol architecture 200A of E-DCH (MAC-i/is) for DTCH/DCCH transmission in CELL_FACH. It can be seen that the protocol architecture depicts a UE protocol stack 210 including MAC-i and MAC-is in communication with a NodeB protocol stack 230 including MAC-i and EDCH FP via a Uu interface 220; the NodeB protocol stack 230 in communication with a DRNC protocol stack 250 including EDCH FP via a Iub interface 240; and the DRNC protocol stack 250 in communication with a SRNC protocol stack 270 including EDCH FP via a Iur interface 260. The various operations associated with the protocol stack 200 are described in more detail in technical specification 3G TS 25.319.

Figure 2B:
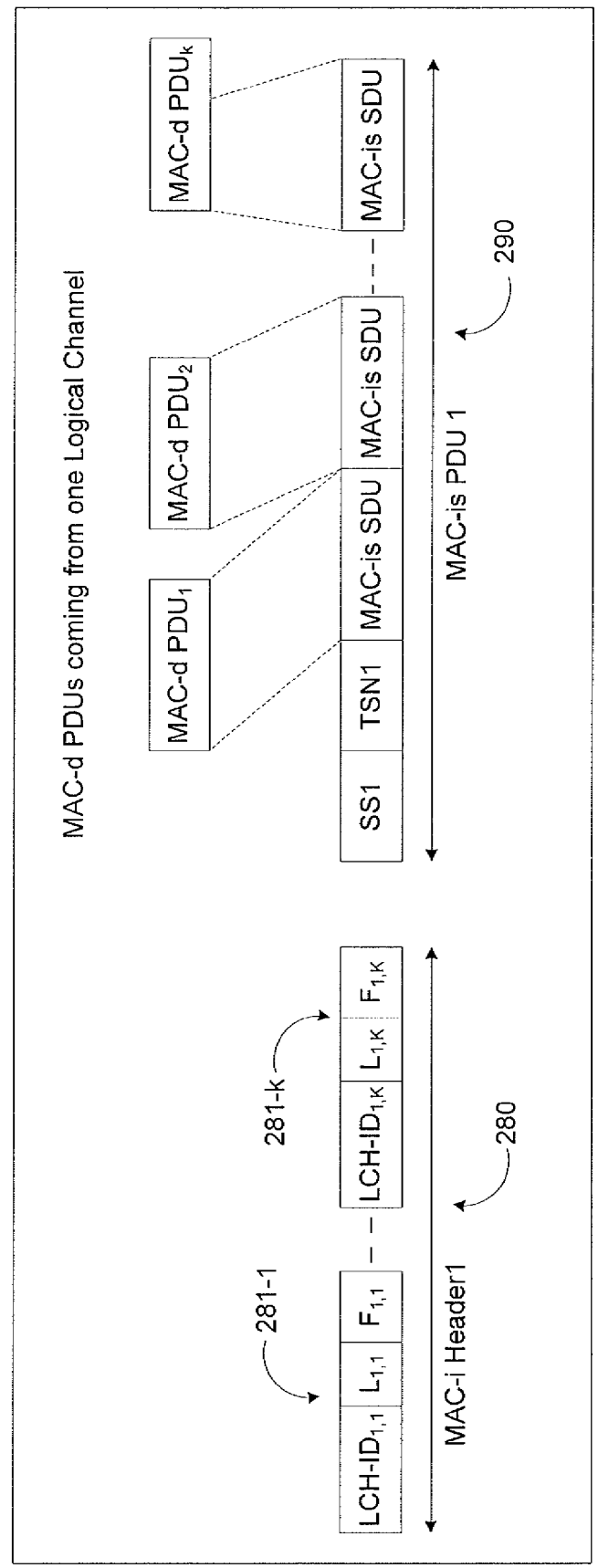
FIG. 2B graphically depicts simplified representations of MAC-i and MAC-is data structures.

FIG. 2B graphically depicts simplified representations of MAC-i and MAC-is data structures. Specifically, FIG. 2B depicts a MAC-i header 280 comprising various fields associated with a first logical channel 281-1 through a $k^{th}$ logical channel 281-K. FIG. 2B also depicts a MAC-is PDU 290 associated with one logical channel and comprising a Segment Status (SS) field, a Transmission Sequence Number (TSN) field and a plurality of Service Data Unit (SDU) field for holding MAC-d PDUs.

The MAC-is at the Radio Network Control (RNC) implements the re-ordering and reassembly functions. The re-ordering process is per logical channel and is based on the Transmission Sequence Number (TSN). At every TTI, all data belonging to the same logical channel is carried in a MAC-is Protocol Data Unit (PDU), which may comprise one or more MAC-is Service Data Units (SDUs). Each MAC-is SDU is mapped to one or a part of a MAC-d PDU. The mapping of MAC-d PDU to RLC PDU is 1:1. To handle new transmission, at every TTI and for each logical channel the UE MAC-i/is generates a new TSN and associates it to a MAC-is PDU. At every TTI, the MAC-i can multiplex multiple logical channels, hence multiple MAC-is PDUs, each of which would carry its own TSN number.

The MAC-i entity is used by the NodeB to handle HARQ retransmissions, scheduling and MAC-i demultiplexing. For DTCH and DCCH transmission, the MAC-is used by the RNC to provide in-sequence delivery (reordering) and to handle combining of data from different NodeBs in case of soft handover.

Various embodiments operate to enable the RNC to efficiently and unambiguously determine that a MAC-is reset at a UE has occurred. In particular, various embodiments provide an indication from a NodeB to a RNC about a given E-DCH connection session. The NodeB can detect when a given UE re-acquires the common E-DCH resources via, illustratively, detecting an enhanced RACH (eRACH)/common E-DCH allocation request, and then the UE's E-RNTI that is used at the E-DCH common resource collision resolution phase. It is noted that for DCCH/DTCH transmission, E-RNTI is included in MAC-i header by the UE during a Collision Resolution phase, after a common E-DCH resource is (re-)acquired.

When the RNC receives an indication of change in a connection session identification, it flushes some or all of the data in the TSN re-ordering queue and restarts the Mac-is re-ordering algorithm. In one embodiment, the NodeB provides an "Acquisition Id" to the RNC on every Iub frame. The "Acquisition Id" only gets incremented when the NodeB detects that the UE is re-acquiring the common E-DCH resources. When the RNC detects a change in the "Acquisition Id", the RNC responsively determines that a Mac-is reset has occurred. In one embodiment, the NodeB provides an explicit MAC-is Reset indicator to the RNC and indicates for a predetermined number of frames that the MAC-is Reset has occurred. This is to handle the case where the first few MAC-is Reset Indicators are lost over the Iub/Iur link due to congestion or some other condition. It is contemplated that the various embodiments may also be combined.

Figure 3:
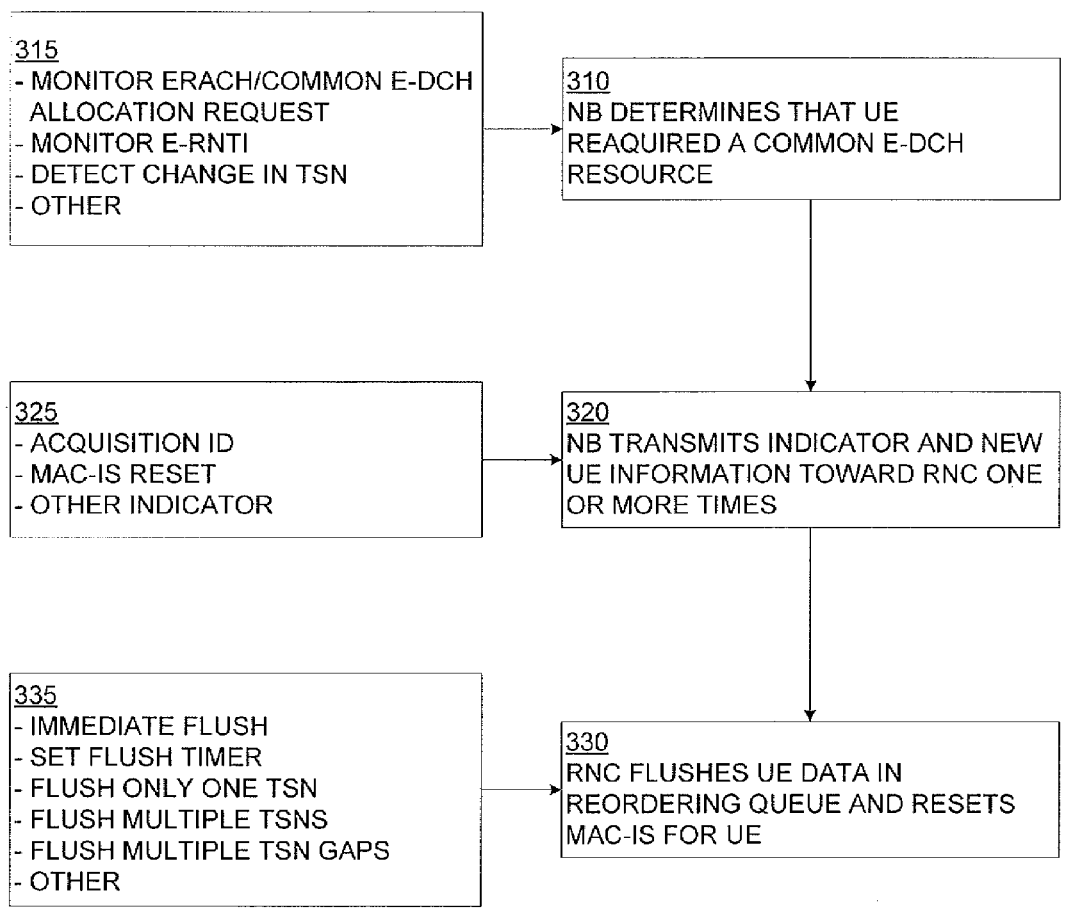
FIGS. 3-4 depict flow diagrams of methods according to various embodiments.

FIG. 3 depicts a flow diagram of a method according to one embodiment. Specifically, the method 300 provides a mechanism for efficiently adapting to a change in E-DCH resource usage by a UE according to one embodiment.

At step 310, the NodeB (NB) determined that a User Equipment (UE) has reacquired a common E-DCH resource. Referring to box 315, the determination of when a given UE re-acquires a common E-DCH resource may be made by, illustratively, detecting an enhanced RACH (eRACH) I common E-DCH allocation request, and then detecting the UE's E-RNTI that is used at the E-DCH common resource acquisition collision resolution phase. It is noted that for DCCH/DTCH transmission, E-RNTI is included in the MAC-i header by the UE during a Collision Resolution phase, after a common E-DCH resource is (re-)acquired. Additionally, the determination may be made by detecting a change in the TSN associated with a UE. Other mechanism may also be used.

At step 320, the NodeB transmits an indicator as well as new UE information associated with the newly acquired common E-DCH resource toward the RNC. In one embodiment, the indicator and new UE information are transmitted within the next Iub frame. In other embodiments, the indicator and new UE information are transmitted within each of a predetermined number of next Iub frames. This latter embodiment offers improved fault resiliency in case of the lost of a single Iub frame including the indicator and new UE information.

Referring to box 325, the indicator may comprise an Acquisition ID, a MAC-is Reset indicator or some other indicator. In one embodiment, the Acquisition ID associated with a UE is a number that only gets incremented in response to a determination that the respective UE as acquired a new common E-DCH resource. In one embodiment, the MAC-is Reset indicator is an explicit indicator used to inform the RNC that a MAC-is Reset has occurred at the UE.

At step 330, the RNC flushes UE data from the respective TSN re-ordering queue and restarts the Mac-is re-ordering algorithm.

Referring to box 335, in one embodiment data is flushed from the TSN re-ordering queue immediately. In another embodiment, a flush timer is set and data is flushed from the TSN re-ordering queue after the expiration of the flush timer. In various other embodiments, a single TSN, multiple TSNs, multiple TSN gaps and/or other portions of the data within the TSN re-ordering queue are flushed, either immediately or after the expiration of the flush timer.

In various embodiments, at step 330 the RNC responsively updates performance and usage data associated with the UE so that the RNC or a cooperating network management system may improve network operations and Key Performance Indicators (KPIs) associated with network usage. For example, the RNC may update statistics related to UE resource consumption, observe actual traffic patterns for UE service or application behavior, and responsively tune High Speed Downlink Packet Access (HSDPA) in CELL_FACH and/or High Speed Uplink Packet Access (HSUPA) in CELL_FACH (e.g., EUL in CELL_FACH) operation parameters.

Figure 4:
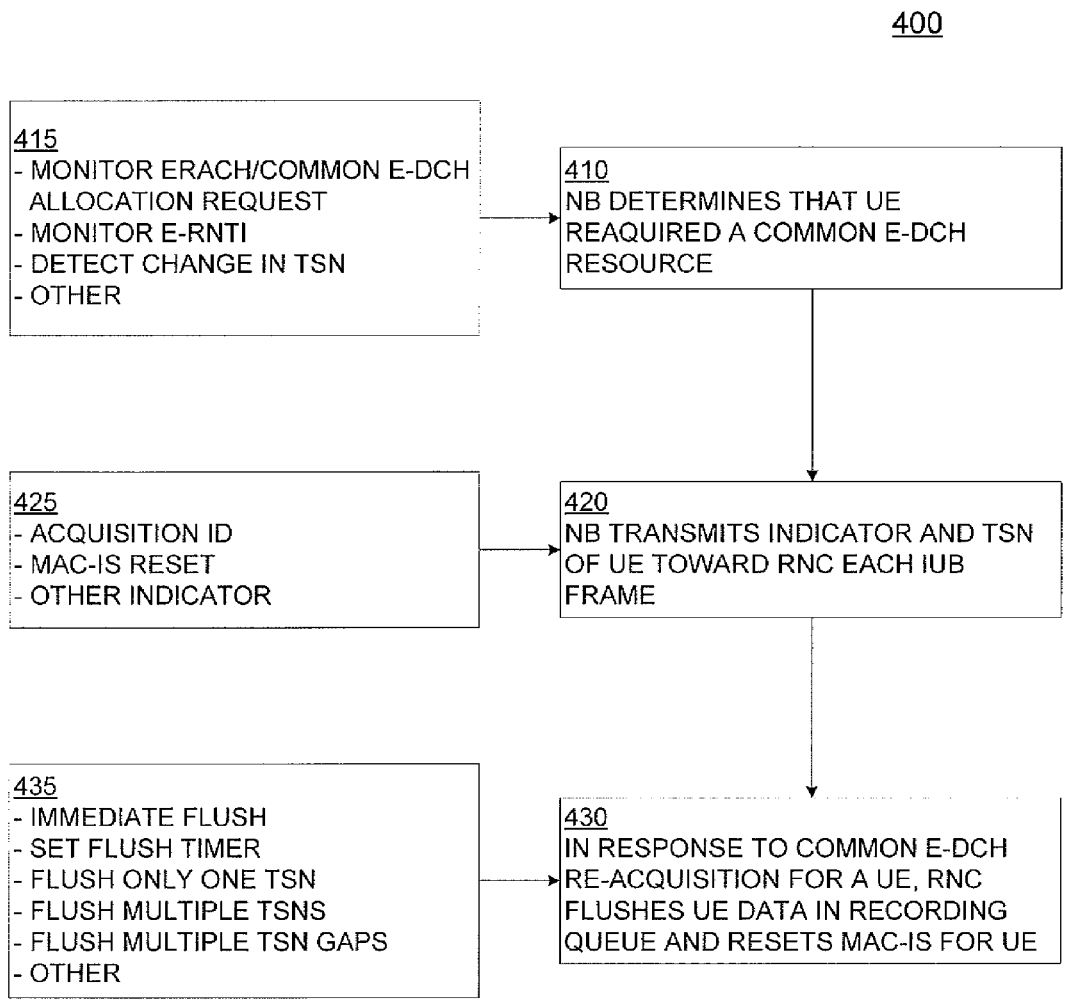

FIG. 4 depicts a flow diagram of a method according to one embodiment. Specifically, the method 400 provides a mechanism for efficiently adapting to a change in E-DCH resource usage by a UE according to one embodiment.

At step 410, the NodeB (NB) updates an indicator if it is determined that a User Equipment (UE) has reacquired a common E-DCH resource. Referring to box 415, the determination of when a given UE re-acquires a common E-DCH resource may be made by, illustratively, detecting an enhanced RACH (eRACH)/common E-DCH allocation request, and then detecting the UE's E-RNTI that is used at the E-DCH common resource acquisition collision resolution phase. It is noted that for DCCH/DTCH transmission, E-RNTI is included in the MAC-i header by the UE during a Collision Resolution phase, after a common E-DCH resource is (re-)acquired. Additionally, the determination may be made by detecting a change in the TSN associated with a UE. Other mechanism may also be used.

At step 420, the NodeB transmits toward the RNC, as part of each Iub frame, the indicator (updated or otherwise) as well as any new UE information associated with a newly acquired common E-DCH resource.

Referring to box 425, the indicator may comprise an Acquisition ID, a MAC-is Reset indicator or some other indicator. In one embodiment, the Acquisition ID associated with a UE is a number that only gets incremented in response to a determination that the respective UE as acquired a new common E-DCH resource. In one embodiment, the MAC-is Reset indicator is an explicit indicator used to inform the RNC that a MAC-is Reset has occurred at the UE.

At step 430, in response to an updated indicator or an explicit MAC-is reset indicative of a common E-DCH acquisition or re-acquisition for a UE, the RNC flushes UE data from the respective TSN re-ordering queue and restarts the Mac-is re-ordering algorithm.

Referring to box 435, in one embodiment data is flushed from the TSN re-ordering queue immediately. In another embodiment, a flush timer is set and data is flushed from the TSN re-ordering queue after the expiration of the flush timer. In various other embodiments, a single TSN, multiple TSNs, multiple TSN gaps and/or other portions of the data within the TSN re-ordering queue are flushed, either immediately or after the expiration of the flush timer.

In various embodiments, at step 430 the RNC responsively updates performance and usage data associated with the UE so that the RNC or a cooperating network management system may improve network operations and Key Performance Indicators (KPIs) associated with network usage. For example, the RNC may update statistics related to UE resource consumption, observe actual traffic patterns for UE service or application behavior, and responsively tune High Speed Downlink Packet Access (HSDPA) in CELL_FACH and/or High Speed Uplink Packet Access (HSUPA) in CELL_FACH (e.g., EUL in CELL_FACH) operation parameters.

Figure 5:
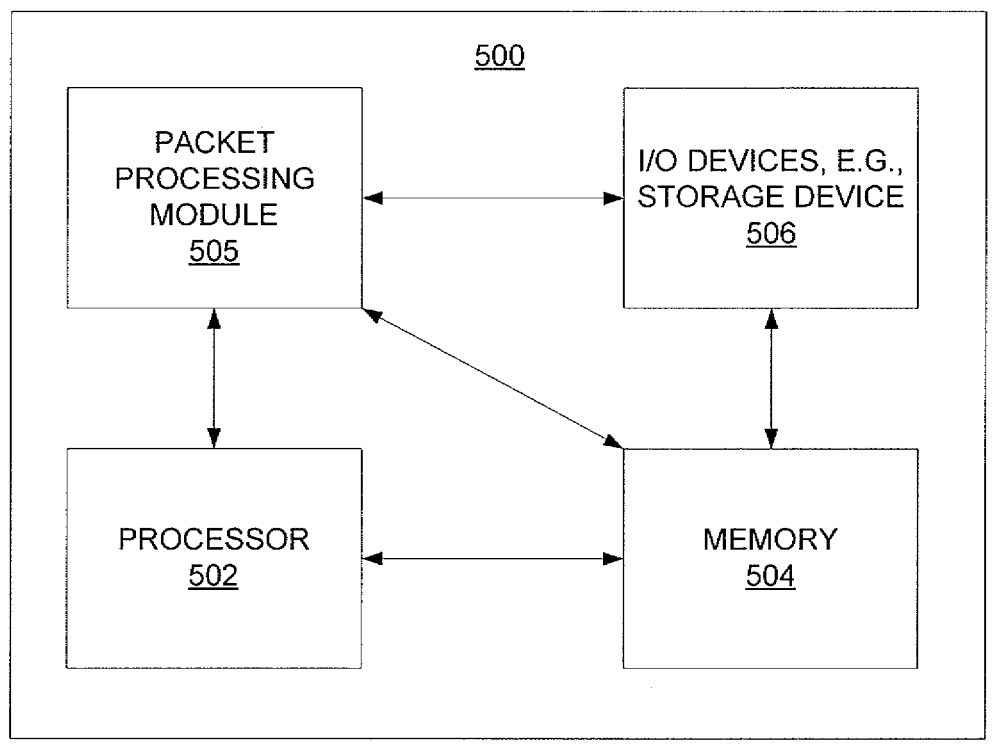
FIG. 5 depicts a high-level block diagram of a general purpose computer suitable for use in performing the functions described herein.

FIG. 5 depicts a high-level block diagram of a general purpose computer suitable for use in performing the functions described herein. In particular, the architecture and functionality discussed herein with respect to the general-purpose computer is adapted for use in each of the various switching and communication elements or nodes discussed herein with respect to the various figures; namely, the UMTS switches 10, the RNCs 20, the NBs 30 and the UEs 30. The various switching or communication elements or nodes include special purpose circuitry and functionality beyond that discussed herein. For simplicity, the discussion herein is limited to a particular control plane functionality related to MAC-is Reset functions. It will be appreciated that some of the functionality discussed herein with respect to describe general purpose computer may be implemented in a particular switching or communication elements or node and/or a network operations center (NOC) or network management system (NMS) operative to configure and manage elements within the network.

As depicted in FIG. 5, system 500 comprises a processor element 502 (e.g., a CPU), a memory 504, e.g., random access memory (RAM) and/or read only memory (ROM), a packet processing module 505, and various input/output devices 506 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It will be appreciated that computer 500 depicted in FIG. 5 provides a general architecture and functionality suitable for implementing functional elements described herein and/or portions of functional elements described herein. Functions depicted and described herein may be implemented in software and/or hardware, e.g., using a general purpose computer, one or more application specific integrated circuits (ASIC), and/or any other hardware equivalents.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, transmitted via tangible media and/or stored within a memory within a computing device operating according to the instructions.

Figure 6:
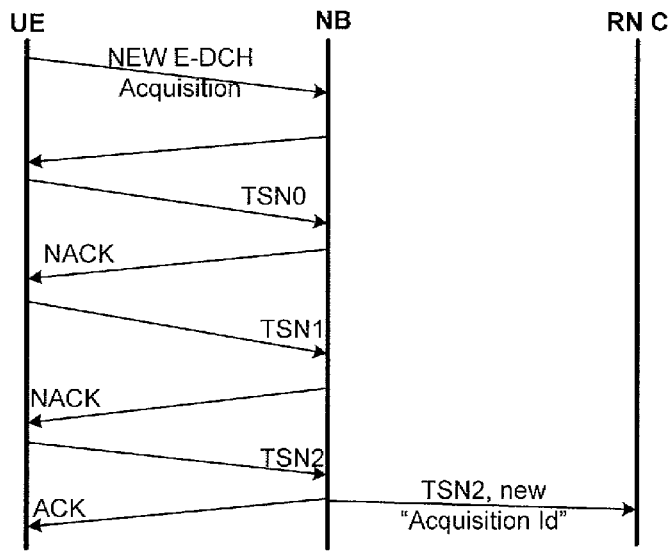
FIGS. 6-8 graphically depict various examples useful in understanding the embodiments.
Figure 7:
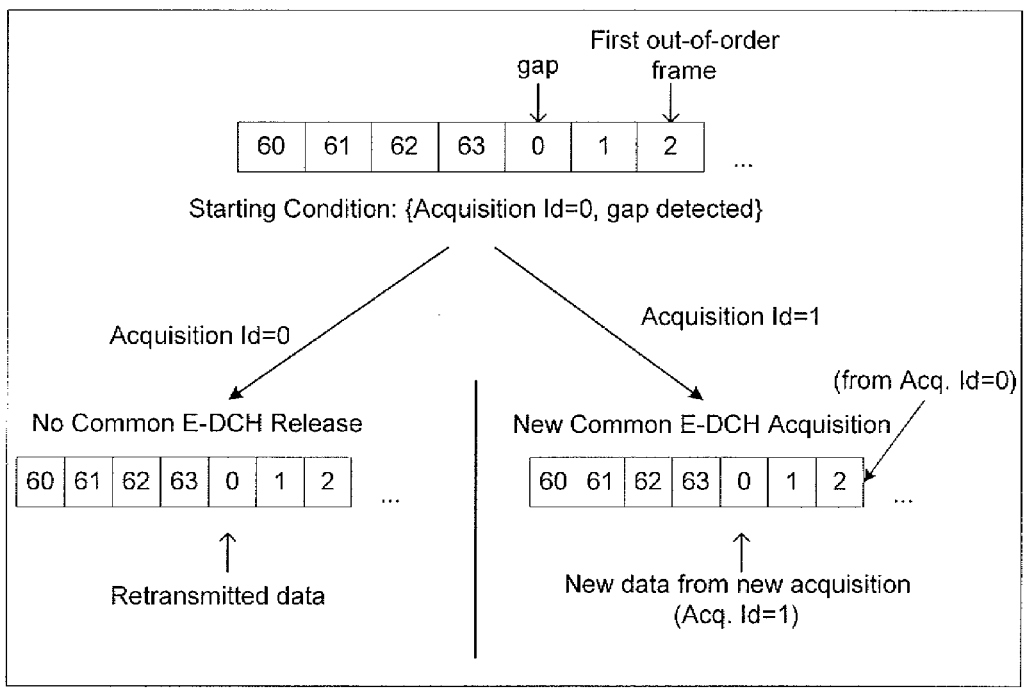
Figure 8:
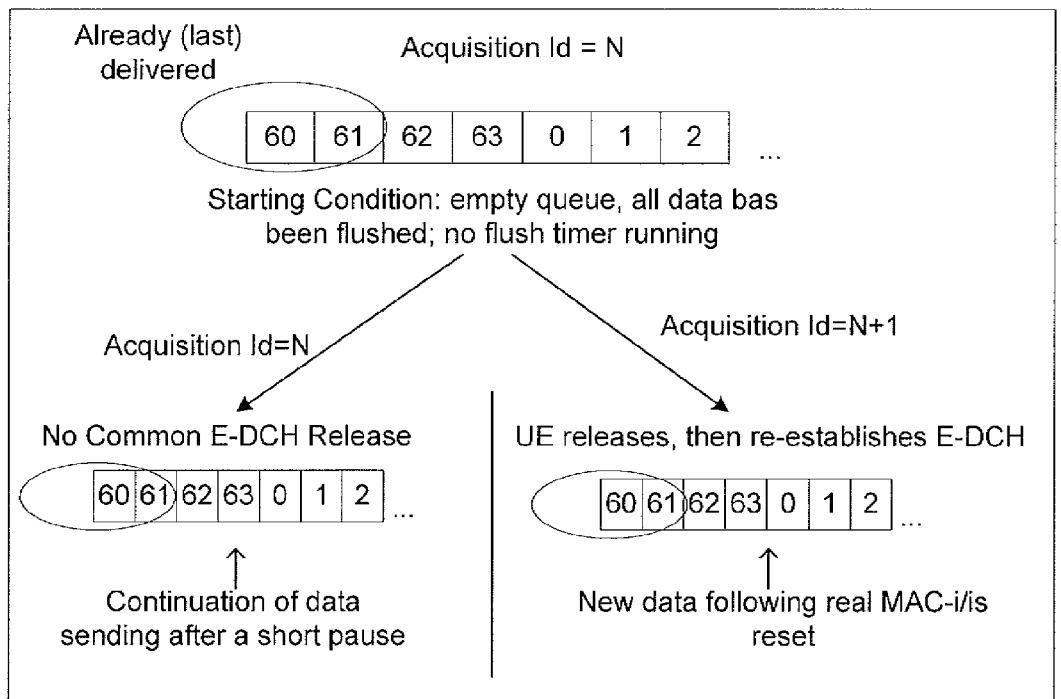

FIGS. 6-8 graphically depict various examples useful in understanding the embodiments.

FIG. 6 graphically depicts a path NB forwarding an indicator to an RNC in response to the detection of a UE is re-acquiring a common E-DCH resource. In this example, when a NodeB detects that a UE is re-acquiring a common E-DCH resource, the NodeB sends a new indicator such as an Acquisition ID along with the new data (TSN2), as illustrated in FIG. 6. Given that the RNC in this example does not have any outstanding TSNs to be flushed, the RNC stores the new TSN (TSN2) and starts a flush timer to wait for TSN0 and TSN1, which have not yet been received. At the expiration of the flush timer, the RNC will flush UE data from the respective TSN re-ordering queue and restart the Mac-is re-ordering algorithm. Thus, the system must wait until the flush timer expiration period has elapsed.

FIG. 7 graphically depicts ambiguity at an RNC between a retransmitted TSN and a new TSN. In this example, it is assumed that TSN2 has been received and that the network has started the flush timer waiting for TSN0 and TSN1 to arrive. Assuming the TTI 10 ms with MaxNharq=4 is used, the flush timer is therefore set to MaxNHarq*NumberOfProcess*TTI=4*4*10 ms=160 ms. On the left hand side of FIG. 7 is depicted the nominal case where the retransmitted TSN0 from the same "Acquisition Id 0" arrives before the timer expires.

Without an indication of UE reacquisition of a common E-DCH channel, the UE will disconnect and reacquire. This could be due to UE mis-detecting NACK as ACK for TSN0/ TSN1 in "Acquisition Id 0", and with "E-DCH transmission continuation back off" set to 0, the UE releases the common E-DCH channel upon the reception of TSN2 ACK in "Acquisition Id 0". Within the next 160 ms, new data arrives resulting in UE acquisition of the common E-DCH resources. When the RNC receives the TSN0 of "Acquisition Id 1", without the "Acquisition Id" information, the TSN0 would wrongly be delivered to the upper layer right away. The TSN2 from the "Acquisition Id 0" would still on hold due to the TSN1 gap. Given that the RLC didn't receive any PDU carried in the "Acquisition Id 0", the RLC would ask for retransmission of the entire {TSN0, TSN1, TSN2} set from the previous "Acquisition Id 0". This results in redundant transmission of TSN2.

With an indication of UE reacquisition of a common E-DCH channel, such as an indicator provided by the NB to the RNC, the RNC can now differentiate between the use cases. When there is a change in the indicator provided to the RNC, the MAC-is at the RNC is reset. In this example, only TSN2 is flushed to a higher layer first. Various embodiments are extendable to include multiple consecutive TSNs beyond TSN2, as well as multiple TSN gaps. Once all the data has been flushed, the MAC-is resumes its nominal re-ordering algorithm. In this case, the TSN0 from the "Acquisition Id 1" is in order, so TSN0 is also immediately delivered to a higher layer, such as after the flushed data.

FIG. 8 graphically illustrates a latency improvement associated with an explicit indicator, such as an Acquisition ID indicator. As a starting condition, all data is assumed to have been delivered and a next expected TSN is 62. In this embodiment, an "E-DCH transmission continuation back off" timer is set to a large value (e.g. 30 TTI of 10 ms=300 ms).

Without an indication of UE reacquisition of a common E-DCH channel, on the left hand side of FIG. 8 is depicted a nominal in-sequence TSN0 is shown to have arrived. However, TSN62 and TSN63 are still waiting for HARQ retransmission. The RNC therefore has to start a flush timer before delivering TSN0. In this case, due to the lack of the actual HARQ retransmission information used by the UE, and the lack of knowledge of when the MAC-is actually transmits downlink data, the RNC cannot have an equivalent timer matching the configured "E-DCH transmission continuation back off" to accurately determine when the MAC-is actually reset. The RNC timer can only be an approximation. It's assumed in this example that the RNC timer is conservative such that the MAC-is reset is not happening yet, and the flush timer has to be started. In this case, a release and re-acquisition of common E-DCH resources may actually happen as depicted on the right hand side of FIG. 8, such that the flush timer is not really needed and only serves to introduce extra traffic latency.

With an indication of UE reacquisition of a common E-DCH channel, such as an indicator provided by the NB to the RNC, upon reception of TSN0 as depicted on the right hand side of FIG. 8, the traffic is delivered to the higher layer immediately. Advantageously, there is also no need for RNC to manage the equivalent of "E-DCH transmission continuation back off" timer.

In the case where an RNC timer has too short an expiry or duration time, upon reception of TSN0 the RNC may incorrectly assume that a MAC-is Reset has happened. Without an indication of UE reacquisition of a common E-DCH channel, the RLC will ask for RLC retransmission of TSN62, and TSN63 while these are still undergoing HARQ retransmission. These extra transmissions of TSN62 and TSN63 would result in waste of common E-DCH bandwidth. However, with an indication of UE reacquisition of a common E-DCH channel, the RNC knows that a Mac-is Reset has not happened, and the RNC may set the flush timer accordingly. Advantageously, this results in efficient common E-DCH bandwidth usage as well as avoiding the need for the RNC to manage the equivalent of "E-DCH transmission continuation back off" timer. Various other implementation and operational benefits advantageously flow from the embodiments discussed herein.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A method for indicating a Mac-is reset condition within a Universal Mobile Telecommunications System (UMTS) system, the method comprising:
    in response to a determination that a user equipment (UE) in communication with a Base Station (NB) has re-acquired a common Enhanced Dedicated Channel (E-DCH) resource, transmitting an indicator of said re-acquired common E-DCH from said Base Station (NB) toward a Radio Network Controller (RNC), said indicator being adapted to cause said RNC to recognize the beginning of a new transmission session using said re-acquired common E-DCH.

2. The method of claim 1, wherein said indicator is adapted to cause said RNC to flush data in a Transmission Sequence Number (TSN) re-ordering queue associated with said UE and restart a corresponding Mac-is re-ordering algorithm.

3. The method of claim 1, wherein said Base Station (NB) determines the UE has re-acquired a common E-DCH resource by detecting an enhanced RACH (eRACH) request and then an allocated common E-DCH transmission associated with the UE.

4. The method of claim 1, wherein, said Base Station (NB) determines the UE has re-acquired a common E-DCH resource by detecting a change in TSN associated with the E-DCH Radio Network Temporary Identifier (E-RNTI) of the UE.

5. The method of claim 1, wherein said indicator comprises an Acquisition ID, said Acquisition ID being transmitted toward said RNC a predefined number of times in response to said determination that a UE has re-acquired a common E-DCH resource.

6. The method of claim 5, wherein said predefined number of Acquisition Id transmissions are adapted to cause said RNC to flush data in a Transmission Sequence Number (TSN) re-ordering queue associated with said UE and restart a corresponding Mac-is re-ordering algorithm.

7. The method of claim 1, wherein said indicator comprises an Acquisition ID, said Acquisition ID being transmitted toward said RNC in each Iub frame, said Base Station (NB) incrementing said Acquisition Id in response to a determination that a UE has re-acquired a common E-DCH resource.

8. The method of claim 7, wherein said incrementing of said Acquisition Id is adapted to cause said RNC to flush data in a Transmission Sequence Number (TSN) re-ordering queue associated with said UE and restart a corresponding Mac-is re-ordering algorithm.

9. The method of claim 1, wherein said indicator comprises a MAC-is reset indicator.

10. The method of claim 2, wherein data is flushed from the TSN re-ordering queue immediately.

11. The method of claim 2, further comprising setting a flush timer, wherein data is flushed from the TSN re-ordering queue after an expiration time of the flush timer.

12. The method of claim 2, wherein all data is flushed from the TSN re-ordering queue.

13. The method of claim 2, wherein a portion of the data is flushed from the TSN re-ordering queue.

14. The method of claim 13, wherein said data portion comprises any of a single TSN, multiple TSNs and multiple TSN gaps.

15. The method of claim 1, wherein said indicator is adapted to cause said RNC to update UE resource consumption statistics and responsively tune network operation to improve Key Performance Indicators (KPIs).

16. The method of claim 15, wherein said tuning of network operation comprises tuning one or more of High Speed Downlink Packet Access (HSDPA) and High Speed Uplink Packet Access (HSUPA) in CELL_FACH.

17. A non-transitory computer readable medium including software instructions which, when executed by a processor, perform a method for indicating a Mac-is reset condition within a Universal Mobile Telecommunications System (UMTS) system, the method comprising:
    in response to a determination that a user equipment (UE) in communication with a Base Station (NB) has re-acquired a common Enhanced Dedicated Channel (E-DCH) resource, transmitting an indicator of said re-acquired common E-DCH from said Base Station (NB) toward a Radio Network Controller (RNC), said indicator being adapted to cause said RNC to recognize the beginning of a new transmission session using said re-acquired common E-DCH.

18. The computer readable medium of claim 17, wherein said indicator is adapted to cause said RNC to flush data in a Transmission Sequence Number (TSN) re-ordering queue associated with said UE and restart a corresponding Mac-is re-ordering algorithm.

19. The computer readable medium of claim 17, wherein said Base Station (NB) determines the UE has re-acquired a common E-DCH resource by detecting an enhanced RACH (eRACH) request and then an allocated common E-DCH transmission associated with the UE.

20. A non-transitory computer program product, wherein a computer is operative using a processor to process software instructions, stored in a non-transitory computer readable storage medium, which adapt the operation of the computer such that computer performs a method for indicating a Mac-is reset condition within a Universal Mobile Telecommunications System (UMTS) system, the method comprising:
    in response to a determination that a user equipment (UE) in communication with a Base Station (NB) has re-acquired a common Enhanced Dedicated Channel (E-DCH) resource, transmitting an indicator of said re-acquired common E-DCH from said Base Station (NB) toward a Radio Network Controller (RNC), said indicator being adapted to cause said RNC to recognize the beginning of a new transmission session using said re-acquired common E-DCH.

21. A system, comprising:
    a base station in communication with User Equipments (UEs) and at least one Radio Network Controller (RNC);
    the base station configured to determine if any UE of the UEs has re-acquired a common Enhanced Dedicated Channel (E-DCH) resource, and to responsively transmit a indicator of said re-acquired a common E-DCH from said Base Station (NB) toward the RNC, said indicator being adapted to cause said RNC to recognize the beginning of a new transmission session using said re-acquired common E-DCH.

22. The system of claim 21, wherein the indicator is adapted to cause the RNC to flush data in a Transmission Sequence Number (TSN) re-ordering queue associated with the UE and to restart a corresponding Mac-is re-ordering algorithm.

* * * * *